United States Patent
Barker et al.

(10) Patent No.: US 11,454,130 B2
(45) Date of Patent: Sep. 27, 2022

(54) BLADE OUTER AIR SEAL WITH INWARD-FACING DOVETAIL HOOKS AND BACKSIDE COOLING

(71) Applicant: United Technologies Corporation, Farmington, CT (US)

(72) Inventors: William M. Barker, North Andover, MA (US); Thomas E. Clark, Sandford, ME (US); William Wangard, III, Stratham, NH (US); Danielle Mahoney, Dover, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 115 days.

(21) Appl. No.: 16/567,541

(22) Filed: Sep. 11, 2019

(65) Prior Publication Data

US 2021/0071584 A1     Mar. 11, 2021

(51) Int. Cl.
*F01D 11/08* (2006.01)
*F02C 7/28* (2006.01)

(52) U.S. Cl.
CPC ............... *F01D 11/08* (2013.01); *F02C 7/28* (2013.01); *F05D 2230/64* (2013.01); *F05D 2240/11* (2013.01); *F05D 2240/55* (2013.01); *F05D 2260/201* (2013.01); *F05D 2300/6033* (2013.01)

(58) Field of Classification Search
CPC .............................. F01D 11/08; F05D 2240/11
See application file for complete search history.

(56) References Cited

U.S. PATENT DOCUMENTS

| | | | |
|---|---|---|---|
| 4,087,199 A | 5/1978 | Hemsworth et al. | |
| 6,315,519 B1 | 11/2001 | Bagepalli et al. | |
| 6,702,550 B2 | 3/2004 | Darkins, Jr. et al. | |
| 6,997,673 B2 | 2/2006 | Morris et al. | |
| 9,945,256 B2 * | 4/2018 | Freeman | F01D 11/12 |
| 10,184,356 B2 * | 1/2019 | McCaffrey | F01D 11/08 |
| 10,196,918 B2 * | 2/2019 | McCaffrey | F01D 11/08 |
| 10,280,801 B2 | 5/2019 | Hafner et al. | |
| 10,323,847 B2 * | 6/2019 | Oswald | F01D 11/005 |
| 10,337,346 B2 * | 7/2019 | McCaffrey | F01D 11/001 |
| 10,364,706 B2 * | 7/2019 | McCaffrey | F01D 11/24 |
| 10,443,616 B2 * | 10/2019 | McCaffrey | F01D 11/12 |
| 10,907,487 B2 * | 2/2021 | Zurmehly | F01D 5/225 |

(Continued)

FOREIGN PATENT DOCUMENTS

| | | |
|---|---|---|
| EP | 3219924 A1 | 9/2017 |
| EP | 3636885 A1 | 4/2020 |

OTHER PUBLICATIONS

European Search Report for European Application No. 20193968.3 completed Mar. 15, 2021.

*Primary Examiner* — Eldon T Brockman
(74) *Attorney, Agent, or Firm* — Carlson, Gaskey & Olds, P.C.

(57) ABSTRACT

A blade outer air seal includes a carrier that has a dovetail and a ceramic seal segment supported on the dovetail. The ceramic seal segment has first and second axial ends, first and second circumferential sides, an inner side, an outer side, and first and second inward-facing dovetail hooks that project from the outer side and define a dovetail key. The ceramic seal segment is axially receivable onto the dovetail of the carrier via the dovetail key.

21 Claims, 6 Drawing Sheets

(56) References Cited

U.S. PATENT DOCUMENTS

| | | | |
|---|---|---|---|
| 2011/0044801 A1 | 2/2011 | Di Paola et al. | |
| 2015/0377035 A1* | 12/2015 | Freeman | F01D 25/246 |
| | | | 416/191 |
| 2016/0146053 A1* | 5/2016 | McCaffrey | F01D 25/24 |
| | | | 415/173.1 |
| 2016/0319841 A1* | 11/2016 | McCaffrey | F01D 25/12 |
| 2017/0191669 A1* | 7/2017 | Oswald | F23R 3/50 |
| 2017/0268361 A1* | 9/2017 | McCaffrey | F01D 25/246 |
| 2017/0268362 A1* | 9/2017 | McCaffrey | F01D 11/08 |
| 2017/0350268 A1* | 12/2017 | McCaffrey | F01D 11/08 |
| 2017/0370240 A1* | 12/2017 | Sippel | F01D 11/005 |
| 2018/0149030 A1 | 5/2018 | Freeman et al. | |
| 2018/0238193 A1 | 8/2018 | Baucco | |
| 2018/0363485 A1 | 12/2018 | Hafner et al. | |
| 2019/0024516 A1 | 1/2019 | Thomas et al. | |
| 2020/0116037 A1* | 4/2020 | Zurmehly | F01D 9/04 |
| 2020/0116039 A1* | 4/2020 | Johnson | F01D 25/246 |

\* cited by examiner

BLADE OUTER AIR SEAL WITH INWARD-FACING DOVETAIL HOOKS AND BACKSIDE COOLING

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section can include rotors that carry airfoils to compress the air entering the compressor section. A shaft may be coupled to the rotors to rotate the airfoils.

SUMMARY

A blade outer air seal according to an example of the present disclosure includes a carrier having a dovetail, and a ceramic seal segment that has first and second axial ends, first and second circumferential sides, an inner side, an outer side, and first and second inward-facing dovetail hooks projecting from the outer side and defining a dovetail key there between. The ceramic seal segment is axially receivable onto the dovetail of the carrier via the dovetail key. The dovetail supports the ceramic seal segment.

In a further embodiment of any of the foregoing embodiments, the dovetail includes first and second outward-facing sloped support surfaces and the first and second inward-facing dovetail hooks have inward-facing sloped support surfaces on which the carrier supports the ceramic seal segment.

In a further embodiment of any of the foregoing embodiments, the inward-facing sloped support surfaces are sloped at angle of at least 15° and less than 90° relative to a radial direction.

In a further embodiment of any of the foregoing embodiments, the first and second inward-facing dovetail hooks are spaced, respectively, from the first and second circumferential sides.

In a further embodiment of any of the foregoing embodiments, the first and second inward-facing dovetail hooks stop short of the first and second axial ends.

In a further embodiment of any of the foregoing embodiments, the carrier includes first and second axial carrier ends, first and second circumferential carrier sides, an inner carrier side facing toward the ceramic seal segment, an outer carrier side facing away from the ceramic seal segment, and the dovetail includes an impingement cooling distributor.

In a further embodiment of any of the foregoing embodiments, the carrier includes carrier hooks that project from the outer carrier side.

In a further embodiment of any of the foregoing embodiments, the impingement cooling distributor includes a wall between the first and second circumferential carrier sides, and the wall includes impingement cooling holes that open to the outer side of the ceramic seal segment.

In a further embodiment of any of the foregoing embodiments, the dovetail includes first and second outward-facing sloped support surfaces on which the carrier supports the ceramic seal segment, and the first and second outward-facing sloped support surfaces flank the wall.

In a further embodiment of any of the foregoing embodiments, the carrier includes an axial stop limiting axial movement of the ceramic seal segment.

In a further embodiment of any of the foregoing embodiments, the carrier includes a seal rail that has a seal surface.

A further embodiment of any of the foregoing embodiments includes a seal along at least one of the first or second circumferential sides of the ceramic seal segment.

A further embodiment of any of the foregoing embodiments includes a spring clip retaining the seal.

The blade outer air seal as recited in claim 1, further comprising metallic liners between the first and second inward-facing dovetail hooks and the dovetail.

In a further embodiment of any of the foregoing embodiments, the ceramic seal segment is selected from the group consisting of monolithic ceramic and ceramic matrix composite.

A gas turbine engine according to an example of the present disclosure includes a compressor section, a combustor in fluid communication with the compressor section, and a turbine section in fluid communication with the combustor. The turbine section includes a plurality of blade outer air seals. Each blade outer air seal includes a carrier having a dovetail, and a ceramic seal segment having first and second axial ends, first and second circumferential sides, an inner side, an outer side, and first and second inward-facing dovetail hooks projecting from the outer side and defining a dovetail key there between. The ceramic seal segment is axially receivable onto the dovetail of the carrier via the dovetail key. The dovetail supports the ceramic seal segment.

In a further embodiment of any of the foregoing embodiments, the first and second inward-facing dovetail hooks are spaced, respectively, from the first and second circumferential sides.

In a further embodiment of any of the foregoing embodiments, the carrier includes first and second axial carrier ends, first and second circumferential carrier sides, an inner carrier side facing toward the ceramic seal segment, an outer carrier side facing away from the ceramic seal segment, and the dovetail includes an impingement cooling distributor comprised of a wall between the first and second circumferential carrier sides and impingement cooling holes in the wall that open to the outer side of the ceramic seal segment.

A method of assembling a blade outer air seal according to an example of the present disclosure includes providing a carrier that has a dovetail, providing a ceramic seal segment that has first and second axial ends, first and second circumferential sides, an inner side, an outer side, and first and second inward-facing dovetail hooks that project from the outer side and define a dovetail key there between, and axially moving the ceramic seal segment between a disassembled position in which the carrier does not support the ceramic seal segment and an assembled position in which the carrier supports the ceramic seal segment.

In a further embodiment of any of the foregoing embodiments, the axially moving includes axially moving the ceramic seal segment from the assembled position to the disassembled position.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
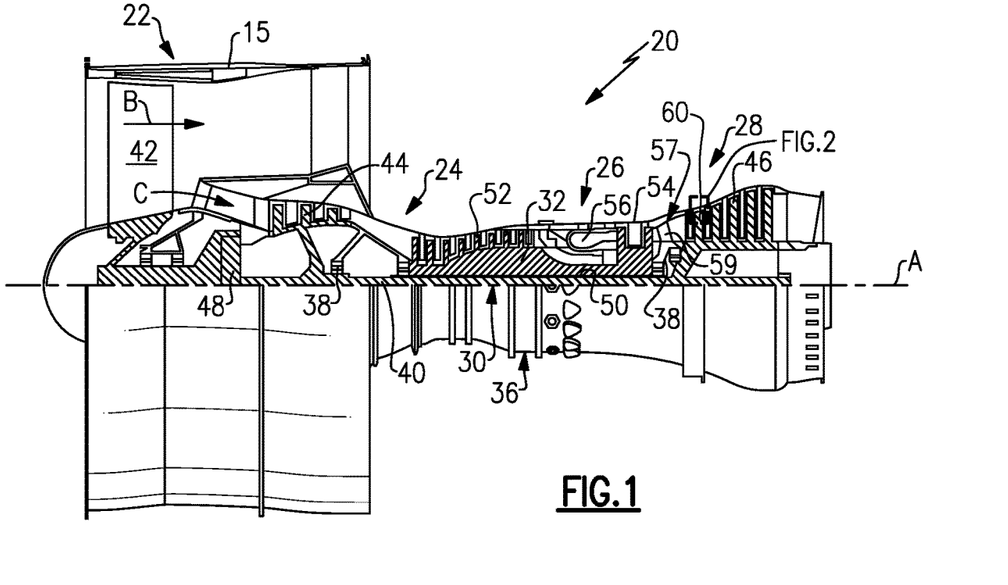
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
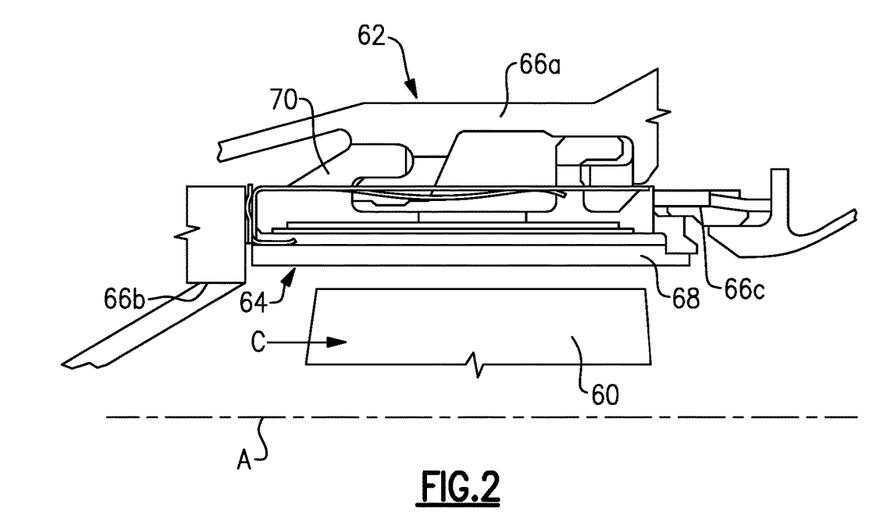
FIG. 2 illustrates the turbine section of the engine.

FIG. 2 illustrates a sectioned view from the turbine section 28. The turbine section 28 includes a row of turbine blades 60 that are rotatable in the core flow path C. A seal system 62 is arranged generally radially outwards of the tips of the blades 60. The seal system 62 includes a circumferential row of blade outer air seals 64 ("seals 64"). The tips of the blades 60 are in close proximity to the seals 64 to reduce gas flow around the tips. The seals 64 are mounted to a surrounding case 66a or other structure. In the example shown, the seals 64 are located axially between a forward structure 66b, such as but not limited to a vane structure, and an aft structure 66c, such as but not limited to a seal structure. And while the seal system 62 is shown in location in the turbine section 28, it is to be understood that the examples herein are not limited to that location.

Each seal 64 comprises a ceramic seal segment 68 and a carrier 70. The ceramic seal segment 68 may serve to maintain tip clearance, resist pressure gradients, seal secondary flow paths off of the core flow path C, and/or protect other structures from the high temperatures in the core flow path C. The carrier 70 serves to attach the ceramic seal segment 68 to the case 66a or other structure. In general, although ceramic materials have high maximum use temperatures, design of ceramic components is challenging because of low proportional stress limits. Modest thermal gradients may cause thermal stresses that exceed desired stress levels in the ceramic. Geometries for circumferential ribs or hooks often increase circumferential stiffness beyond desired levels when the component is under thermal stress, and axial hooks often present sealing performance challenges. However, as will be discussed below, the seal 64 contains features to facilitate reductions in stress and enable forward and trailing end sealing.

Figure 3A:
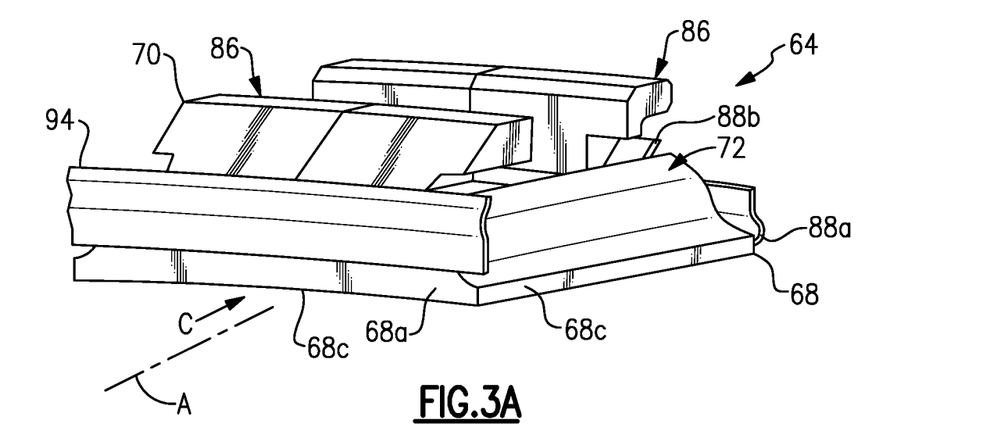
FIG. 3A illustrates an isolated view of a blade outer air seal.
Figure 3B:
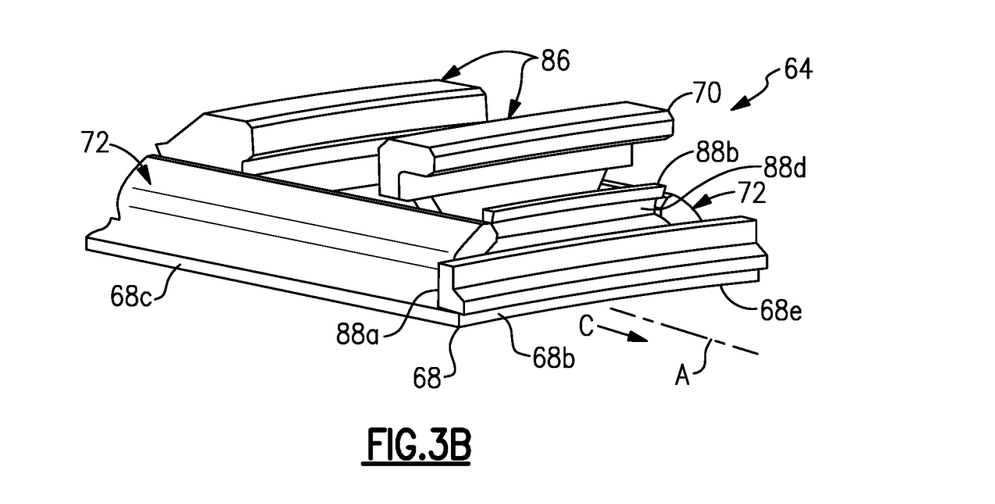
FIG. 3B illustrates another view of the blade outer air seal.
Figure 3C:
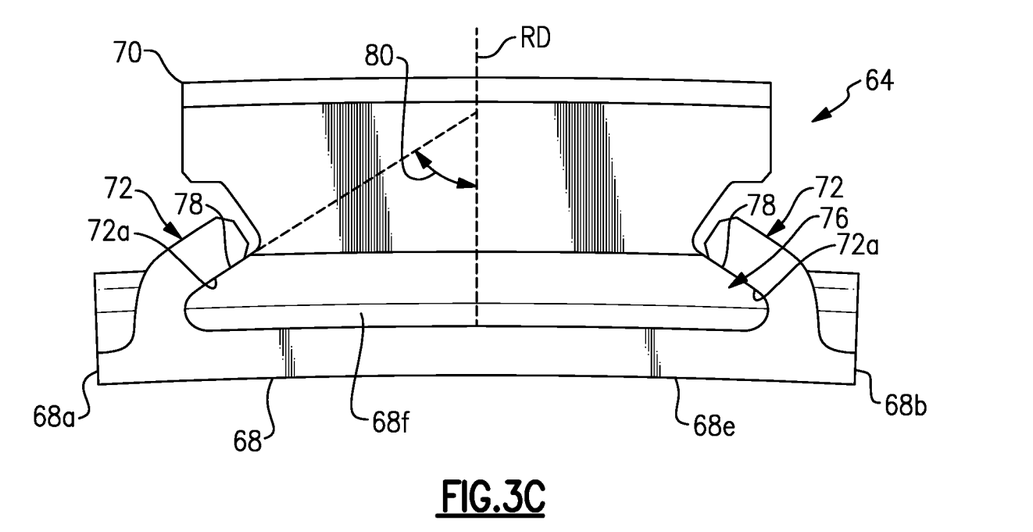
FIG. 3C illustrates a sectioned view of the blade outer air seal.

FIG. 3A shows an isolated view of the seal 64, FIG. 3B shows an isolated view of the seal from another angle, and FIG. 3C illustrates a radially sectioned view of the seal 64. The ceramic seal segment 68 is also shown in an isolated view in FIG. 4, and the carrier 70 is shown in an isolated view in FIG. 5. Referring to these figures, the ceramic seal segment 68 has first and second axial ends 68a/68b, first and second circumferential sides 68c/68d, an inner side 68e, an outer side 68f, and first and second inward-facing dovetail hooks 72 that project from the outer side 68f and define a dovetail key 74 there between. The first axial end 68a is a forward end in the illustrated examples, and the second end 68b is an aft end. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

Figure 4:
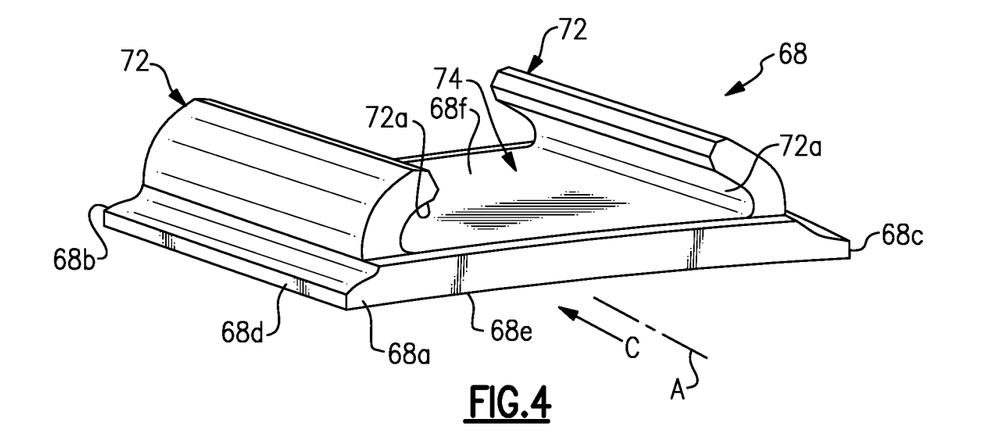
FIG. 4 illustrates an isolated view of a ceramic seal segment of the blade outer air seal.

The inward-facing dovetail hooks 72 are generally axially elongated and run along the respective circumferential sides 68c/68d. As best seen in FIG. 4, the inward-facing dovetail hooks 72 in this example do not extend the full axial length of the ceramic seal segment 68 but instead stop short of the axial ends 68a/68b. This provides axial space for other structures related to sealing, such as the aforementioned brush seal. If a different sealing scheme is used, the hooks 72 may extend close to or all the way to one or both of the axial ends 68a/68b. As also shown, the hooks 72 are spaced inwards from the circumferential sides 68c/68d. This provides circumferential space for segment-to-segment sealing, discussed further below. Again, if a different sealing scheme is used, the hooks 72 may be closer to the circumferential sides 68c/68d.

The hooks 72 project on an incline from the outer side 68f of the ceramic seal segment 68. In this example, the inside base region of each hook 72 is rounded to reduce stress concentration. The hooks 72 have inward-facing support surfaces 72a on which the ceramic seal segment 68 is supported.

It is to be appreciated that terms such as "axial," "radial," "circumferential," and variations of these terms are made with reference to the engine central axis A. The terms "inward" and "outward" refer to position or orientation relative to the midline of the respective component. For example, the respective midlines of the ceramic seal segment 68 and the carrier 70 lie in a plane that contains the engine central axis A and that intersects the ceramic seal segment 68 and the carrier 70 midway between their circumferential sides.

The ceramic seal segment 68 is formed of ceramic material. For instance, the ceramic material is a monolithic ceramic or a ceramic matrix composite. The monolithic ceramic may be a silicon-containing ceramic, such as but are not limited to, silicon carbide (SiC) or silicon nitride ($Si_3N_4$). The ceramic matrix composite may be, but is not limited to, SiC/SiC ceramic matrix composite in which SiC fibers are disposed within a SiC matrix. The ceramic matrix composite may be formed from fibrous plies that are stacked together and consolidated with the matrix.

Figure 5:
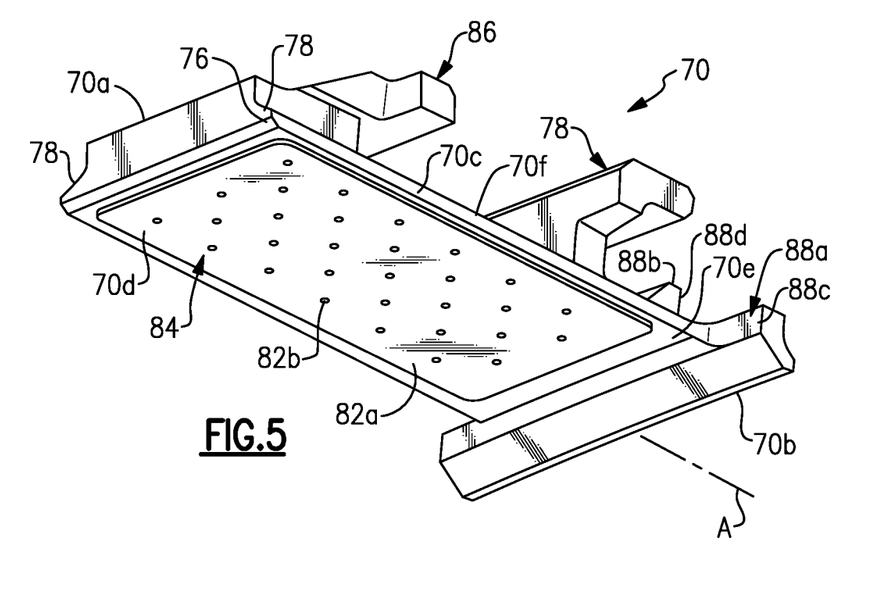
FIG. 5 illustrates an isolated view of a carrier of the blade outer air seal.

The carrier 70 generally includes first and second axial carrier ends 70a/70b, first and second circumferential carrier sides 70c/70d, an inner carrier side 70e that faces toward the ceramic seal segment 68, and an outer carrier side 70f that faces away from the ceramic seal segment 68. The carrier 70 may be formed of a metallic alloy. Example alloys may include, but are not limited to, Ni and Co-based superalloys. Where noted, these alloys may also be used for other components described herein.

In particular, the carrier includes a dovetail 76 for attaching the ceramic seal segment 68. The dovetail 76 is generally elongated in the axial direction and defines first and second outward-facing support surfaces 78 on which the ceramic seal segment 68 is supported. In this example, the support surfaces 78 are sloped relative to the radial direction to facilitate stress-reduction on the ceramic seal segment 68. As an example, as indicated in FIG. 3C, the support surfaces 78 form an included angle 80 with the radial direction RD. In a further example, the included angle 80 is from 15° to less than 90°.

The carrier 70 additionally includes an impingement cooling distributor 82. For example, the impingement cooling distributor 82 is contained in the dovetail 76 and is configured to distribute cooling air, such as bleed air from the compressor section 24, to the outer side 68f of the ceramic seal segment 68. The combination of the dovetail 76 with the distributor 82 integrated therein may also facilitate reduction in packaging size.

In this example, the impingement cooling distributor 82 includes a wall 82a located between the first and second circumferential carrier sides 70c/70d and flanked by the support surfaces 78. The wall 82a may be integral with the remainder of the carrier 70 or a separate piece that is welded or bonded with the remainder of the carrier 70. The wall 82a includes flow features 82b that facilitate delivery of the cooling air. In the illustrated example, the flow features 82b are cooling holes that open to the outer side 68f of the ceramic seal segment 68. The cooling air may be delivered to the outer carrier side 70f and then flow through the cooling holes to impinge on the outer side 68f. The region of the outer side 68f between the hooks 72 and ends 68a/68b is relatively smooth and free of geometric features. The cooling air impinges onto that region, cooling the segment 68.

The space outwards of the outer side of the wall 82a and between attachment features 86 that project from the outer carrier side 70f may serve as a manifold for receiving and distributing the cooling air while also reducing pressure at the outer side 68f. As will be appreciated, the number, type, and pattern of flow features 82b may be adapted to meet cooling needs and facilitate reduction in thermal gradients. Furthermore, as mentioned, the region of the outer side 68f between the hooks 72 and ends 68a/68b is relatively smooth and free of geometric features, which may facilitate thermal management tailoring and uniformity of thermal conductance.

The attachment features 86 serve to attach the carrier 70 to the case 66a or other structure. In the illustrated example, the features 86 are hooks that project from the outer carrier side 70f, although it is to be understood that the features 86 are not limited to hooks.

The carrier 70 further includes an axial stop 88a and a seal rail 88b. In this example, the axial stop 88a is an aft rail that also forms the aft or second end 70b of the carrier 70. The aft rail defines a forward-facing surface 88c. The surface 88c serves as a stop surface against which the ceramic seal segment 68 abuts to limit axially-aft movement of the ceramic seal segment 68.

The seal rail 88b is a ridge that projects from the outer carrier side 70f near the aft or second carrier end 70b. In general, the ridge runs parallel to the second side 70b in the circumferential direction. The seal rail 88b defines an axially-aft-facing seal surface 88d. For example, the aft structure 66c (FIG. 2) may be a seal, such as a brush seal, that mates with and seals against the seal surface 88d. If a different sealing scheme is used, the seal rail 88b may be excluded.

The ceramic seal segment 68 is axially receivable onto the dovetail 76 of the carrier 70 via the dovetail key 74. For instance, the ceramic seal segment 68 and the carrier 70 are provided as initially separate pieces, i.e., in a disassembled position. The ceramic seal segment 68 is brought into alignment with the dovetail 76 and then moved axially such that the dovetail 76 is received into the dovetail key 74. In the illustrated examples, it is the second or aft axial end 68b of the segment 68 that is initially received onto the dovetail 76, i.e., the segment 68 is front-loaded to the first or forward axial carrier end 70a of the carrier 70. Alternatively, the arrangement could be reversed such that the first or forward axial end 68a of the segment 68 is initially received onto the dovetail 76, i.e., the segment 68 is aft-loaded to the second or aft axial carrier end 70b of the carrier 70.

During the axial movement, the support surfaces 72a may slide along the support surfaces 78. However, if the dovetail 76 is shallower than the dove key 74, there may be clearance between the support surfaces 72a and the support surfaces 78. The ceramic seal segment 68 may be moved axially until it abuts the surface 88c of the axial stop 88a. The dovetail 76 secures the segment 68 radially and the axial stop 88a secures the segment in one direction axially. If an axial stop is excluded from the carrier 70, the ceramic seal segment 68 may be moved axially until it is centered or substantially centered on the carrier 70.

In the assembled position shown, the support surfaces 72a of the ceramic seal segment 68 rest on the support surfaces 78 of the carrier 70. For instance, the support surfaces 72a and the support surfaces 78 are complementary such that there is interfacial contact there between. Such interfacial contact permits stresses to be distributed over a relatively large area of the hooks 72. To further facilitate reductions in radial packaging size, the hooks 72 may also be circumferentially between attachment features of the case 66a that engage the attachment features 86 of the carrier 70.

The procedure above refers to an assembly of the seal 64. The assembly may be part of an original manufacture of the seal 64 or as part of a repair or replacement procedure. Inversely, the seal 64 may be disassembled, where the ceramic seal segment 68 is axially moved in the opposite direction to remove it from the dovetail 76. The disassembly may also be part of a repair or replacement procedure, or even as part of an original manufacture to check fit, for example.

Figure 6:
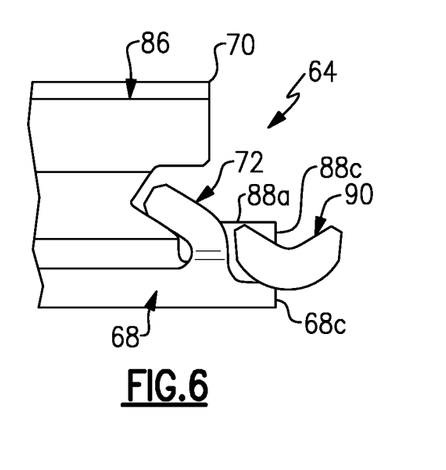
FIG. 6 illustrates a further example in which there is a seal located along a circumferential side of the ceramic seal segment.

FIG. 6 illustrates a further example in which there is an inter-segment seal 90 located along the first circumferential side 68c of the ceramic seal segment 68. As discussed above, the hooks 72 are spaced from the sides 68c/68d to provide circumferential space. The inter-segment seal 90 resides in the circumferential space and may run axially from the axial stop 88a to the side 68a. A similar inter-segment seal 90 may also be used along the second circumferential side 68d. The inter-segment seal or seals 90 facilitate sealing the joints between adjacent ceramic seal segments 68.

The inter-segment seal 90 may be formed of a metallic or ceramic material, such as but not limited to, the alloys and ceramics disclosed herein above. In the example shown, the inter-segment seal 90 is a wedge seal that wedges between adjacent segments 68 to seal the segment-to-segment joint. The wedge seal generally has an arc shape with a rounded side oriented toward the side 68c. One circumferential side of the inter-segment seal 90 may abut the hook 72. Although not shown, the other circumferential side of the inter-segment seal 90 may abut the hook 72 of the next adjacent segment 68. In this regard, the inter-segment seal 90 is wedged between hooks 72 of adjacent segments 68.

Figure 7:
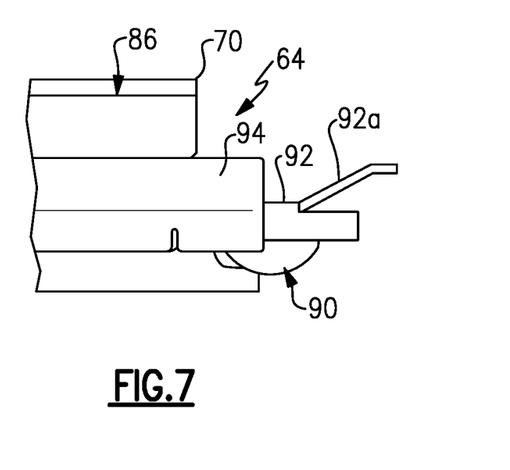
FIG. 7 illustrates a further example in which there is a spring clip.

As shown in FIG. 7, a spring clip 92 may additionally be provided to facilitate retaining the inter-segment seal 90 in its proper seated position over the joint. In this regard, the clip 92 includes a spring arm 92a. Another structure (not shown) may be provided to abut the spring arm to maintain the inter-segment seal 90 in compression. The spring clip 92 and/or inter-segment seal 90 may be retained axially by an axial face seal 94 that is carried on the ceramic seal segment 68. The face seal also seals with the aforementioned structure 66b (FIG. 2). The face seal 94 will be discussed in further detail below. If a different sealing scheme is used, the hooks 72 may be designed to be farther or closer to the circumferential sides 68c/68d to accommodate other types of seal components and subject to competing packaging requirements.

Figure 8:
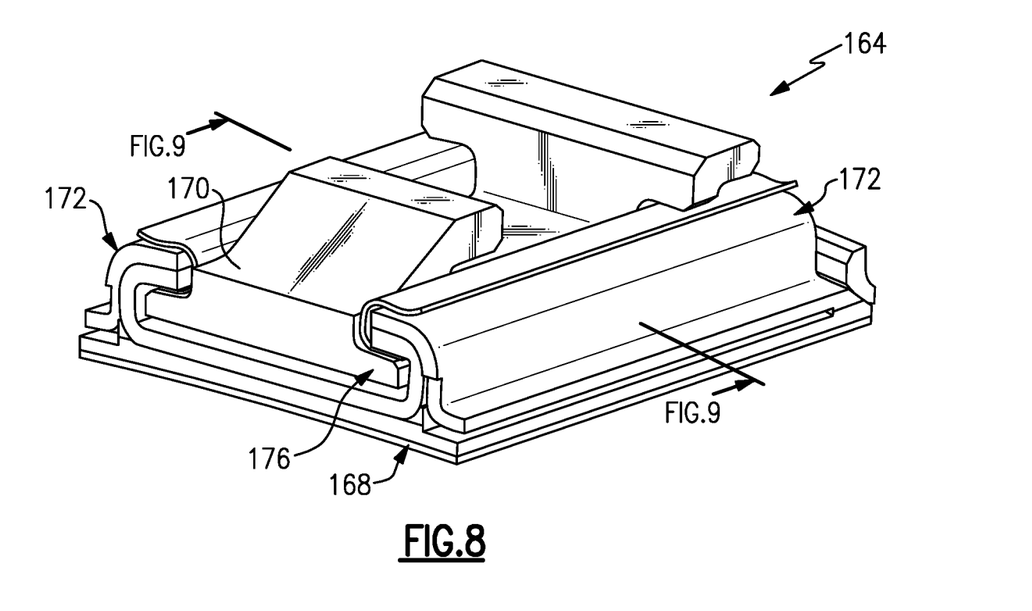
FIG. 8 illustrates another example blade outer air seal that has liners.

FIG. 8 illustrates another example seal 164. In this disclosure, like reference numerals designate like elements where appropriate and reference numerals with the addition of one-hundred or multiples thereof designate modified elements that are understood to incorporate the same features and benefits of the corresponding elements. In this example, the support surfaces 172a of the inward-facing dovetail hooks 172 of the ceramic seal segment 168 and the support surfaces 178 of the dovetail 176 of carrier 170 are less inclined than those of the seal 64. As a result, the included angle 80 of the support surfaces 178 is greater than that of the support surfaces 78. For instance, the included angle of the support surfaces 178 may be less than 90° and at least 15°.

Figure 9:
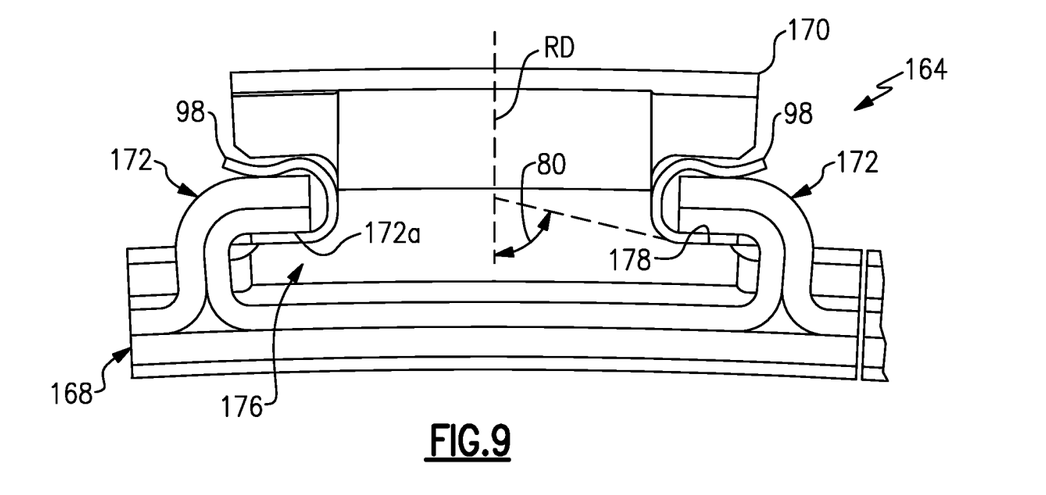
FIG. 9 illustrates a sectioned view of the blade outer air seal of FIG. 8.

The seal 164 may further include metallic liners 98 between the hooks 172 and the dovetail 176. The liners 98 may serve to reduce wear on the carrier 170 from the harder ceramic of the seal segment 168. For example, the liners 98 are formed of the alloys disclosed elsewhere herein, such as a cobalt-based alloy. The liners 98 may also serve to facilitate fit between the segment 168 and the carrier 170. For example, the liners 98 are malleable and can conform to the shape of the hooks 172 and carrier 170 to provide a secure interference fit there between.

Figure 10:
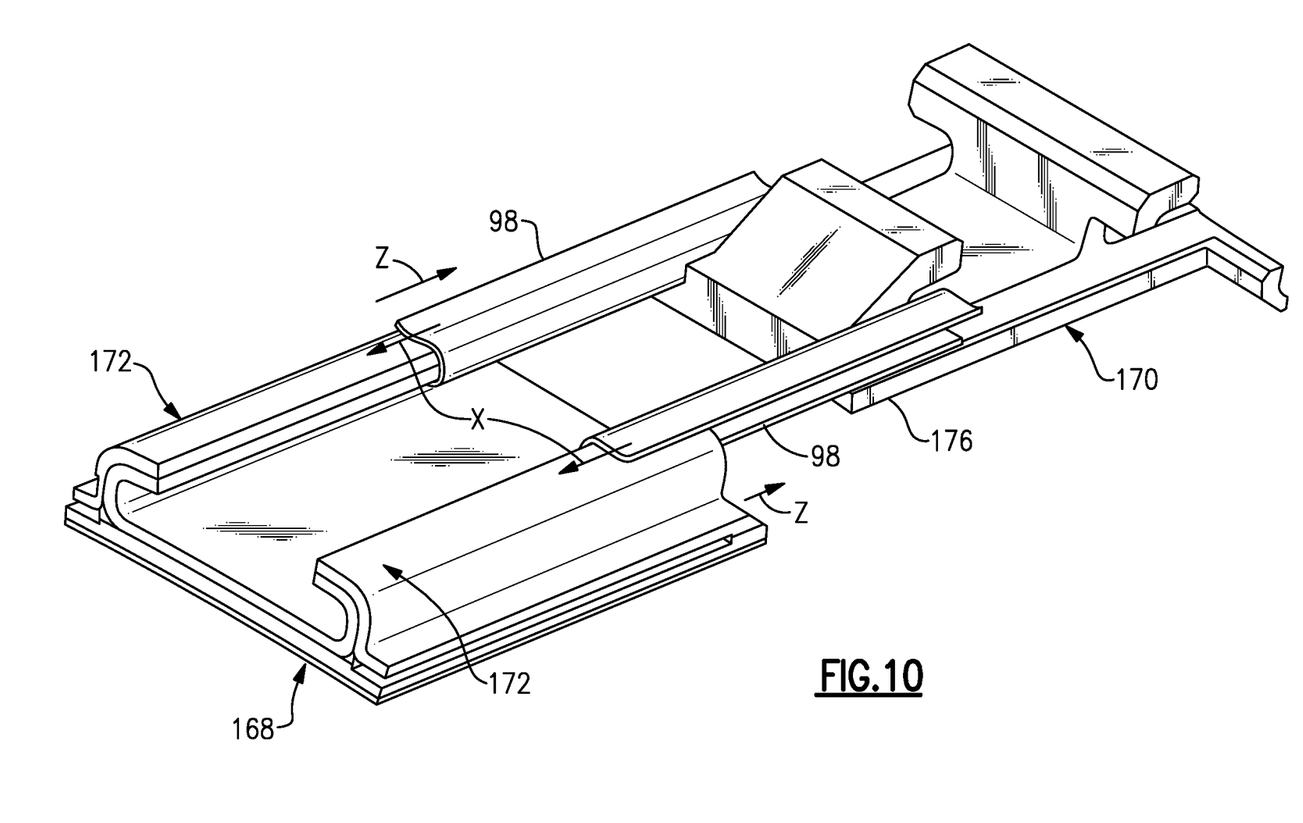
FIG. 10 illustrates an assembly involving the liners.

As shown in FIG. 10, the liner 98 can be installed during assembly of the seal 164. For instance, as indicated at arrows X, the liners 98 may first be moved axially onto the hooks 172. As indicated at arrows Z, the segment 164 with liners 98 is then moved axially onto the dovetail 176 as described above. As will be appreciated, the liners 98 may alternatively first be installed onto the dovetail 176, followed by axially moving the segment 164 onto the dovetail 176 and liners 98.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A blade outer air seal comprising:
   a carrier having a dovetail, the carrier being disposed about a gas turbine engine central axis; and
   a ceramic seal segment having, relative to the gas turbine engine central axis, first and second axial ends, first and second circumferential sides, a seal segment midline that is midway between the first and second circumferential sides, a radially inner side facing toward the gas turbine engine central axis, a radially outer side facing away from the gas turbine engine central axis, and first and second inward-facing dovetail hooks projecting from the outer side and turning toward the seal segment midline, the first and second inward-facing dovetail hooks defining a dovetail key there between, the dovetail being axially receivable into the dovetail key between the first and second inward-facing dovetail hooks, the dovetail supporting the ceramic seal segment via the first and second inward-facing dovetail hooks.

2. The blade outer air seal as recited in claim 1, wherein the dovetail carrier has a carrier midline that is midway between first and second circumferential carrier sides, the carrier includes first and second outward-facing sloped support surfaces that face away from the carrier midline and that face radially outwardly relative to the gas turbine engine central axis, and the first and second inward-facing dovetail hooks have inward-facing sloped support surfaces that face toward the gas turbine engine central axis on which the carrier supports the ceramic seal segment.

3. The blade outer air seal as recited in claim 2, wherein the inward-facing sloped support surfaces are sloped at angle of at least 15° and less than 90° relative to a radial direction from the gas turbine engine central axis.

4. The blade outer air seal as recited in claim 1, wherein relative to the gas turbine engine central axis the carrier includes first and second axial carrier ends, first and second circumferential carrier sides, a radially inner carrier side facing toward the ceramic seal segment and toward the gas turbine engine central axis, a radially outer carrier side facing away from the ceramic seal segment and away from the gas turbine engine central axis, and the dovetail includes an impingement cooling distributor.

5. The blade outer air seal as recited in claim 4, wherein the impingement cooling distributor includes a wall between the first and second circumferential carrier sides, and the wall includes impingement cooling holes that open to the radially outer side of the ceramic seal segment.

6. The blade outer air seal as recited in claim 5, wherein the dovetail carrier has a carrier midline that is midway between first and second circumferential carrier sides, the dovetail includes first and second outward-facing sloped support surfaces that face away from the carrier midline, away from the gas turbine engine central axis, and on which the carrier supports the ceramic seal segment, and the first and second outward-facing sloped support surfaces flank the wall.

7. The blade outer air seal as recited in claim 4, wherein the carrier includes a pair of carrier hooks that, relative to the gas turbine engine central axis, project radially-outwards from the radially outer carrier side, and wherein each carrier hook of the pair of carrier hooks is a curved arm.

8. The blade outer air seal as recited in claim 1, wherein relative to the gas turbine engine central axis the carrier includes an axial stop limiting axial movement of the ceramic seal segment.

9. The blade outer air seal as recited in claim 1, wherein the carrier includes a seal rail that has a seal surface.

10. The blade outer air seal as recited in claim 1, further comprising a seal along at least one of the first or second circumferential sides of the ceramic seal segment.

11. The blade outer air seal as recited in claim 10, further comprising a spring clip retaining the seal that is along at least one of the first or second circumferential sides of the ceramic seal segment.

12. The blade outer air seal as recited in claim 1, wherein the ceramic seal segment is selected from the group consisting of monolithic ceramic and ceramic matrix composite.

13. The blade outer air seal as recited in claim 1, wherein the dovetail carrier has a carrier midline that is midway between first and second circumferential carrier sides, the dovetail includes first and second outward-facing sloped support surfaces that face away from the carrier midline, and the first and second inward-facing dovetail hooks have, respectively, first and second inward-facing sloped support surfaces in contact with, respectively, the first and second outward-facing sloped support surfaces of the dovetail.

14. The blade outer air seal as recited in claim 1, wherein the first and second inward-facing dovetail hooks have, respectively, first and second inward-facing sloped support surfaces that face toward the seal segment midline and toward the gas turbine engine central axis, there being, respectively, first and second pockets defined radially between the first and second inward-facing sloped support surfaces and the radially outer side of the ceramic seal segment, and the dovetail includes first and second corners that are disposed in, respectively, the first and second pockets.

15. The blade outer air seal as recited in claim 1, wherein the first and second inward-facing dovetail hooks are proximate, respectively, the first and second circumferential sides.

16. The blade outer air seal as recited in claim 1, wherein the dovetail is a sole dovetail support of the ceramic seal segment.

17. The blade outer air seal as recited in claim 1, further comprising metallic cobalt alloy liners between the first and second inward-facing dovetail hooks and the dovetail.

18. A gas turbine engine comprising:
   a compressor section;
   a combustor in fluid communication with the compressor section; and
   a turbine section in fluid communication with the combustor, the turbine section including a plurality of blade outer air seals, each said blade outer air seal comprising:

a carrier having a dovetail, the carrier being disposed about a gas turbine engine central axis, and a ceramic seal segment having, relative to the gas turbine engine central axis, first and second axial ends, first and second circumferential sides, a seal segment midline that is midway between the first and second circumferential sides, a radially inner side facing toward the gas turbine engine central axis, a radially outer side facing away from the gas turbine engine central axis, and first and second inward-facing dovetail hooks projecting from the outer side and turning toward the seal segment midline, the first and second inward-facing dovetail hooks defining a dovetail key there between, the dovetail being axially receivable into the dovetail key between the first and second inward-facing dovetail hooks, the dovetail supporting the ceramic seal segment via the first and second inward-facing dovetail hooks.

19. The engine as recited in claim 18, wherein relative to the gas turbine engine central axis the carrier includes first and second axial carrier ends, first and second circumferential carrier sides, a radially inner carrier side facing toward the ceramic seal segment and toward the gas turbine engine central axis, a radially outer carrier side facing away from the ceramic seal segment and away from the gas turbine engine central axis, and the dovetail includes an impingement cooling distributor comprised of a wall between the first and second circumferential carrier sides and impingement cooling holes in the wall that open to the outer side of the ceramic seal segment.

20. A method of assembling a blade outer air seal, the method comprising:

providing a carrier that has a dovetail and this is disposed about a gas turbine engine central axis;

providing a ceramic seal segment that has, relative to the gas turbine engine central axis, first and second axial ends, first and second circumferential sides, a seal segment midline that is midway between the first and second circumferential sides, a radially inner side that faces toward the gas turbine engine central axis, a radially outer side that faces away from the gas turbine engine central axis, first and second inward-facing dovetail hooks that project from the outer side and turn toward the seal segment midline, and the first and second inward-facing dovetail hooks define a dovetail key there between; and relative to the gas turbine engine central axis, axially moving the ceramic seal segment between a disassembled position in which the carrier does not support the ceramic seal segment and an assembled position in which the dovetail is received into the dovetail key between the first and second inward-facing dovetail hooks such that the dovetail supports the ceramic seal segment via the first and second inward-facing dovetail hooks.

21. The method as recited in claim 20, wherein the axially moving includes axially moving the ceramic seal segment from the assembled position to the disassembled position.

* * * * *